US008842626B2

(12) United States Patent
Davydov et al.

(10) Patent No.: US 8,842,626 B2
(45) Date of Patent: Sep. 23, 2014

(54) CO-PHASING OF TRANSMISSIONS FROM MULTIPLE INFRASTRUCTURE NODES

(75) Inventors: Alexei Davydov, Nizhny Novgorod (RU); Alexander Maltsev, Nizhny Novgorod (RU); Gregory V. Morozov, Nizhny Novgorod (RU); Vadim Sergeyev, Nizhny Novgorod (RU); Yuan Zhu, Beijing (CN); Kamran Etemad, Potomac, MD (US); Xiangying Yang, Portland, OR (US); Yujian Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 14 days.

(21) Appl. No.: 13/524,146

(22) Filed: Jun. 15, 2012

(65) Prior Publication Data

US 2012/0257575 A1 Oct. 11, 2012

Related U.S. Application Data

(63) Continuation of application No. PCT/US2011/054286, filed on Sep. 30, 2011.

(60) Provisional application No. 61/439,987, filed on Feb. 7, 2011.

(51) Int. Cl.
*H04W 4/00* (2009.01)
*H04B 7/04* (2006.01)
(Continued)

(52) U.S. Cl.
CPC .............. *H04L 27/26* (2013.01); *H04B 7/0456* (2013.01); *H04W 72/042* (2013.01); *H04B 7/024* (2013.01); *H04B 7/0619* (2013.01); *H04W 24/02* (2013.01); *H04L 1/06* (2013.01); *H04W 56/0085* (2013.01); *H04W 56/0045* (2013.01)
USPC ........... 370/329; 370/328; 370/330; 370/516; 375/371; 375/347

(58) Field of Classification Search
CPC ............ H04W 56/0035; H04W 72/12; H04W 72/121; H04W 74/002; H04W 72/0453; H04W 84/006
USPC ................. 370/331, 315, 500, 310, 328–330, 370/324–325, 334, 338, 342–343, 345, 350, 370/491, 516; 375/344, 267, 371, 347
See application file for complete search history.

(56) References Cited

U.S. PATENT DOCUMENTS 5,241,544 A * 8/1993 Jasper et al. ................... 370/478
7,558,330 B2 * 7/2009 Hafeez ........................... 375/267
(Continued)

FOREIGN PATENT DOCUMENTS

WO 2012/108912 A1 8/2012

OTHER PUBLICATIONS

International Search Report and Written Opinion Received for PCT Patent Application No. PCT/US2011/054286, Mailed on Apr. 10, 2012, 9 pages.
(Continued)

*Primary Examiner* — Charles C Jiang
*Assistant Examiner* — Mohamed Kamara
(74) *Attorney, Agent, or Firm* — Cool Patent, P.C.

(57) ABSTRACT

Briefly, in accordance with one or more embodiments, mobile station or user equipment receives pilot signals from two or more infrastructure nodes in a distributed antenna system, and calculates phase or timing information, or combinations thereof, from the pilot signals. The mobile station feeds back the phase or timing information, or combinations thereof, to the infrastructure nodes, and then receives one or more subsequent transmissions from the infrastructure nodes with phase shift or timing adjustments, or combinations thereof, calculated by the infrastructure nodes and applied to the spatial streams transmitted by the infrastructure nodes.

14 Claims, 7 Drawing Sheets

(51) Int. Cl.
| | |
|---|---|
| *H04W 72/04* | (2009.01) |
| *H04B 7/02* | (2006.01) |
| *H04B 7/06* | (2006.01) |
| *H04W 24/02* | (2009.01) |
| *H04L 1/06* | (2006.01) |
| *H04W 56/00* | (2009.01) |
| *H04L 27/26* | (2006.01) |

(56) References Cited

U.S. PATENT DOCUMENTS

| | | | |
|---|---|---|---|
| 8,130,867 B2* | 3/2012 | Budianu et al. | 375/299 |
| 2001/0024430 A1* | 9/2001 | Sekine et al. | 370/331 |
| 2002/0065564 A1* | 5/2002 | Sheriff et al. | 700/11 |
| 2008/0212702 A1 | 9/2008 | Pan et al. | |
| 2009/0257533 A1* | 10/2009 | Lindoff et al. | 375/344 |
| 2009/0316842 A1 | 12/2009 | Lu et al. | |
| 2010/0046681 A1 | 2/2010 | Van Nee | |
| 2010/0265874 A1* | 10/2010 | Palanki et al. | 370/315 |
| 2011/0286376 A1* | 11/2011 | Yoo et al. | 370/312 |

OTHER PUBLICATIONS

International Preliminary Report on Patentability received for PCT Patent Application No. PCT/US2011/054286, mailed on Aug. 22, 2013, 6 pages.

* cited by examiner

CO-PHASING OF TRANSMISSIONS FROM MULTIPLE INFRASTRUCTURE NODES

CROSS-REFERENCE TO RELATED APPLICATIONS

The present application is a continuation under 35 U.S.C. 365(c) of International Application No. PCT/US2011/054286 filed Sep. 30, 2011, which in turn claims the benefit of U.S. Provisional Application No. 61/439,987 filed Feb. 7, 2011 . Said Application No. PCT/US2011/054286 and said Application No. 61/439,987 are hereby incorporated herein by reference in their entireties.

BACKGROUND

One of the currently studied techniques for performance enhancement of Fourth Generation (4G) broadband wireless cellular networks is Coordinated MultiPoint (CoMP) processing. In order for this technique to operate correctly and increase the network performance, signals cooperatively sent from multiple infrastructure nodes to mobile stations may be co-phased. Lack of co-phasing of signals sent by different infrastructure nodes to a mobile station may result in a number of problems such as increased channel frequency selectivity, possibility of destructive addition of the signals at certain frequencies, and overall performance degradation.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 1:
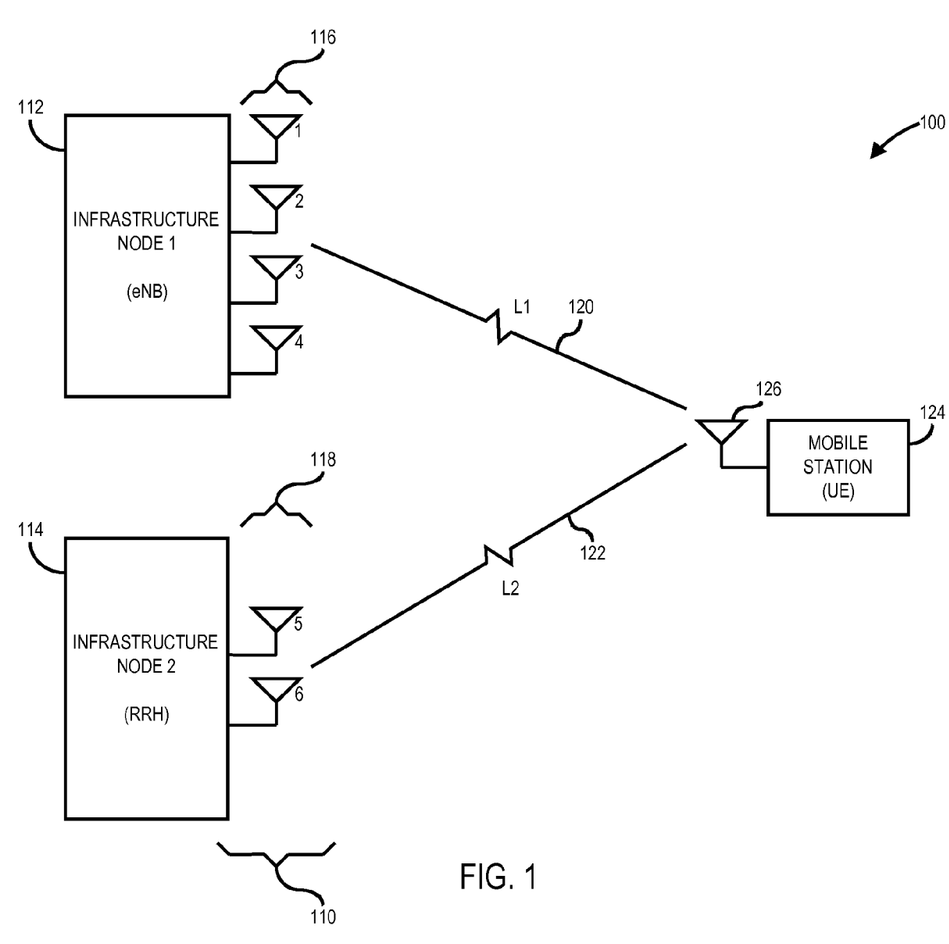
FIG. 1 is a diagram of a coordinated multipoint (CoMP) transmission system in which co-phasing adjustments of transmissions from multiple infrastructure nodes may be applied in accordance with one or more embodiments.

Referring now to FIG. 1, a diagram of a coordinated multipoint transmission system in which co-phasing adjustments of transmissions from multiple infrastructure nodes may be applied in accordance with one or more embodiments will be discussed. As shown in FIG. 1, Coordinated MultiPoint (CoMP) transmission system 100 may comprise two or more infrastructure nodes such as infrastructure node 112 and a second infrastructure node 114 that may implement Coordinated MultiPoint (CoMP) transmission to a mobile station 124. Coordinated MultiPoint (CoMP) processing for Fourth Generation (4G) broadband wireless cellular networks involves coordination between several infrastructure nodes to receive/transmit data from/to mobile stations. In one example embodiment, infrastructure node 112 may comprise an eNodeB (eNB) of a Long Term Evolution (LTE) network, infrastructure node 114 may comprise a remote radio head (RRH), and mobile station 124 may comprise user equipment (UE), although the scope of the claimed subject matter is not limited in this respect. In some realizations of a transmission system, an eNodeB and one or more RRH infrastructure nodes may behave as a distributed antenna system (DAS) implementing multiple-input, multiple-output (MIMO) signal processing to implement Coordinated MultiPoint communications. To implement MIMO communications, infrastructure node 112 may have a first set of antennas 116 (antennas 1 through 4) and infrastructure node 114 may have a second set of antennas 110 (antennas 5 through 6). The two sets of antennas transmit coordinated signals via a first transmission link (L1) 120 and a second transmission link (L2) 122 to the antenna 126 of the mobile station. In some embodiments, the mobile station 124 may have a single antenna, and in other embodiments the mobile station 124 may have two or more antennas.

In a traditional MIMO system the multi-element antenna of a transmitter is assumed to be localized wherein the multi-element antenna array is assumed to be much smaller in size than the distance between the receiver and the transmitter, for example between the eNodeB and the mobile station. However, in CoMP schemes that utilize a distributed, multi-element antenna approach as shown in FIG. 1, the assumption does not hold true. In such an arrangement, some elements of the distributed antenna system (DAS) may appear substantially closer to the mobile station 124 than the other antenna elements. As a result, the difference in propagation delays between the different DAS antenna elements and the mobile station 124 may also be large, thereby causing large phase differences due to difference in times of arrival of the signals at the mobile station 124 between the signals coming from different DAS nodes of the distributed antenna system.

The phase differences between signals propagating from the multiple infrastructure nodes are dependent on difference of times of arrival, the subcarrier number of the transmissions and the difference in channel transfer functions between different DAS nodes and the mobile station 124 corresponding to the subcarrier number. As a result, for DAS deployment in a Coordinated MultiPoint (CoMP) transmission system 100 the combined channel between the DAS nodes and the mobile station 124 may appear hostile and frequency-selective. The frequency selectivity of the combined DAS channel may be severe enough to make the assumption of the channel near-flatness within an LTE sub-band not valid. In accordance with one or more embodiments, a co-phasing procedure may be performed at the DAS nodes, eNodeB infrastructure node 112 and RRH infrastructure node 114, to align the transmissions of the distributed antenna elements. As will be discussed in further detail, below, the phase differences are measured and adjustments are made so that the phases of the signals between the infrastructure nodes may be coordinated.

Figure 2:
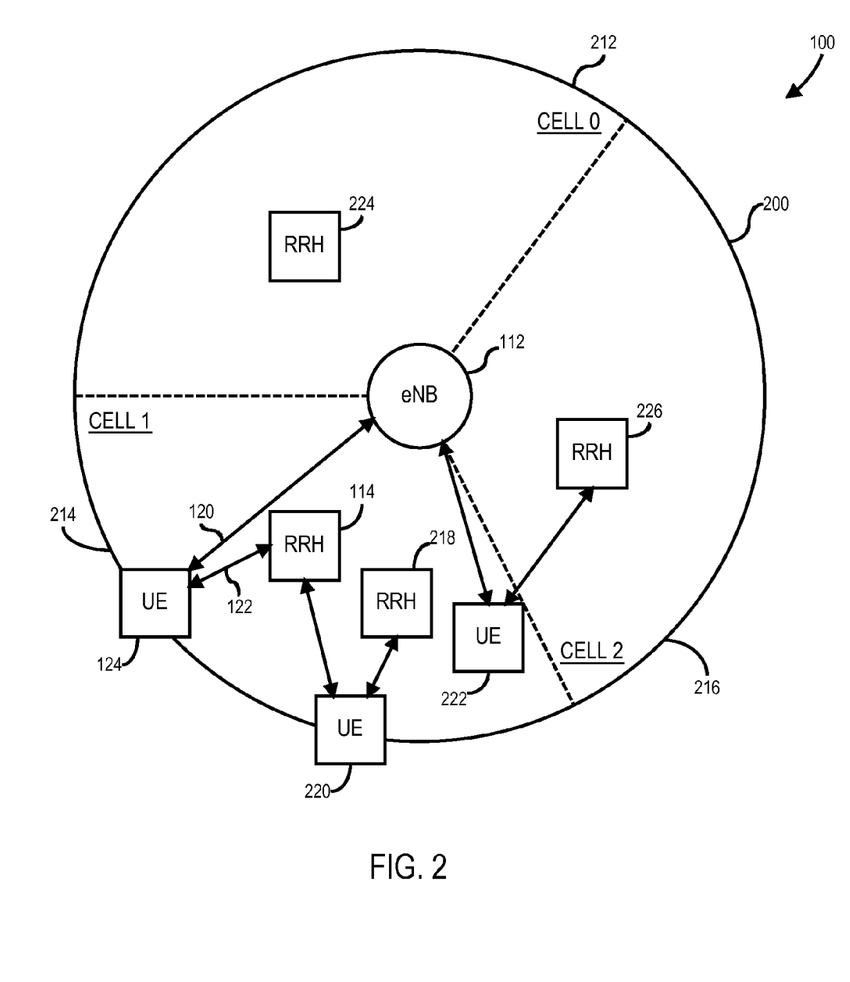
FIG. 2 is a diagram of an enhanced Node B (eNB) serving multiple sectors of multiple cells implementing coordinated multipoint (CoMP) transmission in accordance with one or more embodiments.

Referring now to FIG. 2, a diagram of an enhanced Node B (eNB) serving multiple sectors of multiple cells Coordinated MultiPoint (CoMP) transmission system in accordance with one or more embodiments will be discussed. As shown in FIG. 2, Coordinated MultiPoint (CoMP) transmission system 100 may include an enhanced Node B (eNB) infrastructure node 112 serving multiple sectors such as sector 212 of Cell 0, sector 214 of Cell 1, and sector 216 of Cell 2 of a cellular communication system. In one or more embodiments, eNB infrastructure node 112 may be part of a Third Generation (3G) or Fourth Generation (4G) communication system in accordance with a Third Generation Partnership Project (3GPP) Long Term Evolution (LTE) or LTE-Advanced standard. Alternatively, in some embodiments eNB infrastructure node 112 may be part of an Institute of Electrical Engineers (IEEE) IEEE 802.16 standard such as IEEE 802.16e or IEEE 802.16m standard to implement a Worldwide Interoperability for Microwave Access (WiMAX) network or a WiMAX-II network, although the scope of the claimed subject matter is not limited in this respect. Although Coordinated MultiPoint (CoMP) transmission system 100 may be discussed with respect to a given standard, the claimed subject matter is not limited to any particular standard, or release or version of that standard, and may encompass further versions or releases of those standards including standards not yet in existence but which may come into existence in the future.

As shown in FIG. 2, enhanced NodeB (eNB) infrastructure node 112 may communicate with devices in an eNB coverage area 200 that the eNB infrastructure node 112 is capable of serving. In one or more embodiments, eNB infrastructure node 112 may communicate with devices that are located in the same sector or different sectors within the eNB coverage area 200. In general, eNB infrastructure node 112 may implement intra-eNB coordinated multipoint transmission (CoMP) with devices located anywhere in the eNB coverage area wherein the eNB infrastructure node 112 controls the CoMP operation. In some embodiments, one or more remote radio heads (RRH), also known as a remote radio unit (RRU) or remote radio element (RRE), may be deployed within a sector, for example RRH infrastructure node 114 and RRH infrastructure node 218 deployed in sector 214 as shown in FIG. 2. The RRHs may include radio-frequency (RF) circuits to enhance the coverage, throughput and/or link quality of eNB infrastructure node 112, for example to implement coordinated multipoint (CoMP) transmission and/or carrier aggregation. In such a Coordinated MultiPoint (CoMP) transmission system 100, one or more user equipment (UE) devices such as UE 124, UE 220, and/or UE 222 may communicate with eNB infrastructure node 112 and/or one or more of RRH 114 or RRH 218. In one or more embodiments, CoMP may be implemented wherein a common or shared media access control (MAC) and radio resource control (RRC) manage multiple physical (PHS') devices or cells such as RRH 114 and RRH 218 operating on the same frequency. Intra-eNB CoMP allows joint processing and beam forming across multiple cells by coordinating RRH infrastructure node 114 with a single eNB infrastructure node 112. The cells may be implemented via different antenna orientations of the eNB infrastructure node 112 to serve different sectors of the same cell site or eNB coverage area 200 where eNB 112 is located (such as sectors 212, 214 and 216), or alternatively the cells may be implemented via one or more remote radio heads such as RRH 114 and RRH 218 to provide local coverage within a given sector 214. It should be noted that the remote radio head (RRH) infrastructure nodes may be located within one or more sectors of the eNB coverage area 200, such as RRH 224 located in sector 212 and/or RRH 226 located in sector 216, and the scope of the claimed subject matter is not limited in this respect. For example, eNB infrastructure node 112 and RRH infrastructure node 226 located may cooperate to serve UE 222. Using one or more RRH infrastructure nodes in addition to eNodeB infrastructure node 112 may be referred to a distributed antenna system (DAS) deployment as shown in and described with respect to FIG. 1.

In accordance with one or more embodiments, the infrastructure nodes 112 and 114 may send and/or receive data to and/or from one or more mobile stations 124 in a cooperative manner so that a particular mobile station 124 is served by several infrastructure nodes 112 and 114 simultaneously. The infrastructure nodes 112 and 114 and/or the mobile station 124 are capable of measuring the differences in phase and/or the time of arrival between the signals received by the mobile station 124 from several infrastructure nodes 112 and 114 using reference or sounding signals. In one example embodiment, for example a 3GPP LTE-Advanced system, such reference signals may comprise Channel State Information Reference Signals (CSI-RS) or Sounding Reference Signals (SRS), although the scope of the claimed subject matter is not limited in this respect. The results of the measurements may be communicated to the infrastructure nodes 112 and 114 via an information element provided in the control protocol. Information carried in such an information element may include the raw phases or phase differences for subcarriers or groups of subcarriers, estimates of time differences between signals coming from different infrastructure nodes 112 and 114 onto the mobile station 124, and/or phase adjustments for an infrastructure node to maximize the signal strength on the mobile station 124, and/or other metrics. The infrastructure nodes 112 and 114 may adjust phases of the signals transmitted on a group of subcarriers (a sub-band) in response to the control information. In one particular embodiment discussed in greater detail with respect to FIG. 5, below, the phases may be adjusted in accordance with a linear function wherein the phase adjustments are proportional to the number of a given subcarrier, or some other function. A method to measure and coordinate the phase of the transmissions in such DAS transmission links such as link 120 and link 122 for the downlink is shown in and described with respect to FIG. 3, below.

Figure 3:
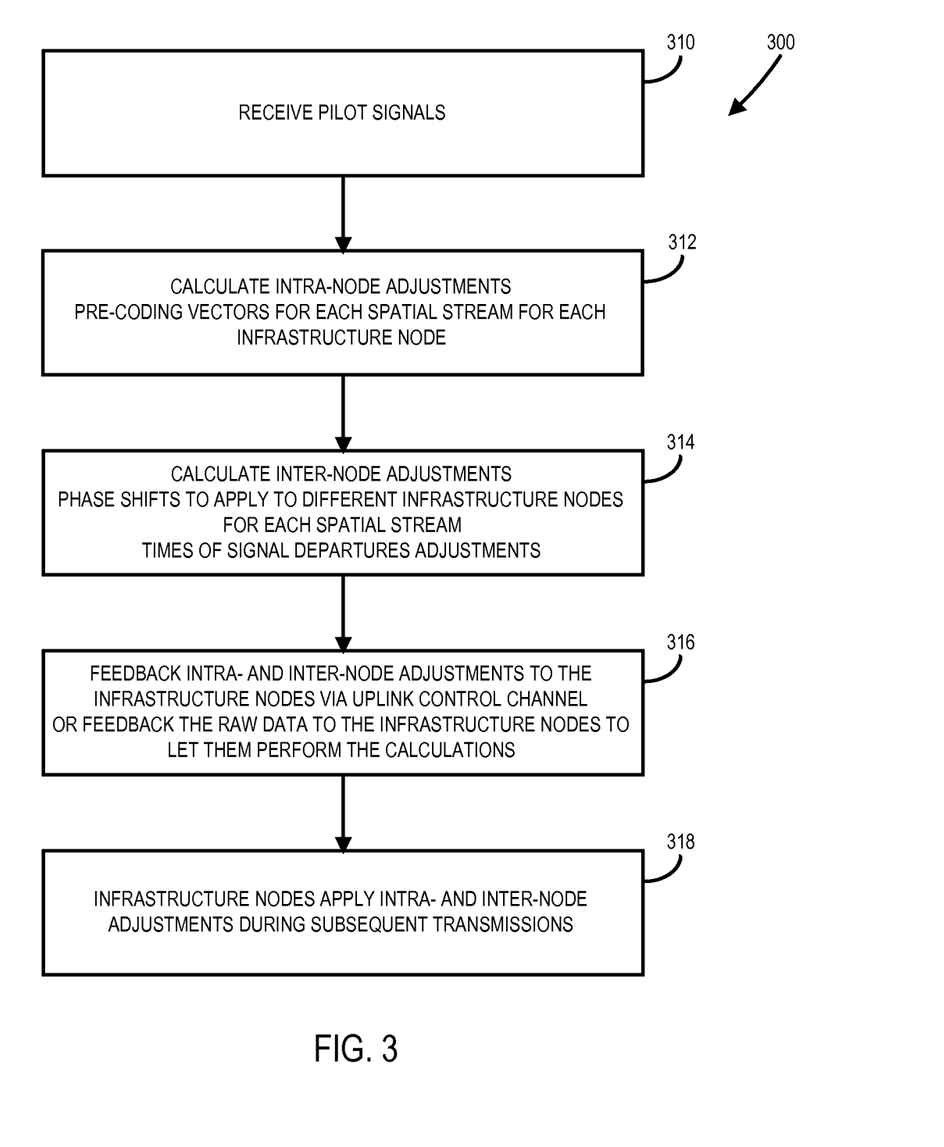
FIG. 3 is a flow diagram of a method to obtain co-phasing measurements in the downlink in accordance with one or more embodiments.

Referring now FIG. 3, a flow diagram of a method to obtain co-phasing measurements in the downlink in accordance with one or more embodiments will be discussed. Although FIG. 3 shows one example order of blocks of a method 300 to obtain co-phasing measurements in the downlink, method 300 may encompass various other orders of the blocks, or may include more or fewer blocks, and the scope of the claimed subject matter is not limited in this respect. In the downlink, the mobile station 124 may directly estimate the phase differences and/or the time of arrival differences between reference signals coming from different infrastructure nodes 112 and 114. Then, the mobile station 124 can either report this information in a raw form to the infrastructure nodes 112 and 114, or the mobile station 124 may process the estimates to obtain the estimate of the time delay between the infrastructure nodes, or some other metric, and report the resulting values back to the infrastructure nodes 112 and 114. In such an embodiment, the mobile station 124 receives pilot signals 310 from the infrastructure nodes 112 and 114. At block 312, the mobile station 124 may then calculate intra-node adjustments needed by calculating pre-coding vectors for each spatial stream for each of the infrastructure nodes 112 and 114. At block 314, the mobile station 124 may then calculate inter-node adjustments by calculating the phase shifts or timing adjustments to apply to the different infrastructure nodes 112 and 114 for each spatial stream, for example by applying adjustments per subcarrier across one or more sub-bands of the transmitted signals as discussed with respect to FIG. 5, below, and/or by calculating the times of signal departure adjustments. At block 316, the mobile station 124 feeds back the intra-node and inter-node adjustments to the infrastructure nodes 112 and 114 via an uplink control channel. Alternatively, the mobile station 124 may feedback the raw data to the infrastructure nodes 112 and 114, for example by skipping blocks 312 and 314, and letting the infrastructure nodes 112 and 114 make calculate the intra-node and inter-node adjustments themselves. In general, in such alternative embodiments, calculation may be made anywhere on the network side and not necessarily by the infrastructure nodes, for example by a server that is capable of performing the phase and/or timing calculations to arrive at the adjustments that then provides the calculated adjustments to one or more of the infrastructure nodes which then apply the adjustments in one or more subsequent transmissions. In general, any such device on the network capable of making such phase and/or timing adjustment calculations may be referred to as an adjustment calculator, and the scope of the claimed subject matter is not limited in this respect. In any event, at block 318, the infrastructure nodes 112 and 114 may apply the intra-node and inter-node adjustments during one or more consecutive transmissions. In one or more alternative embodiments, the co-phasing measurements may be obtained in the uplink as shown in and described with respect to FIG. 4, below.

Figure 4:
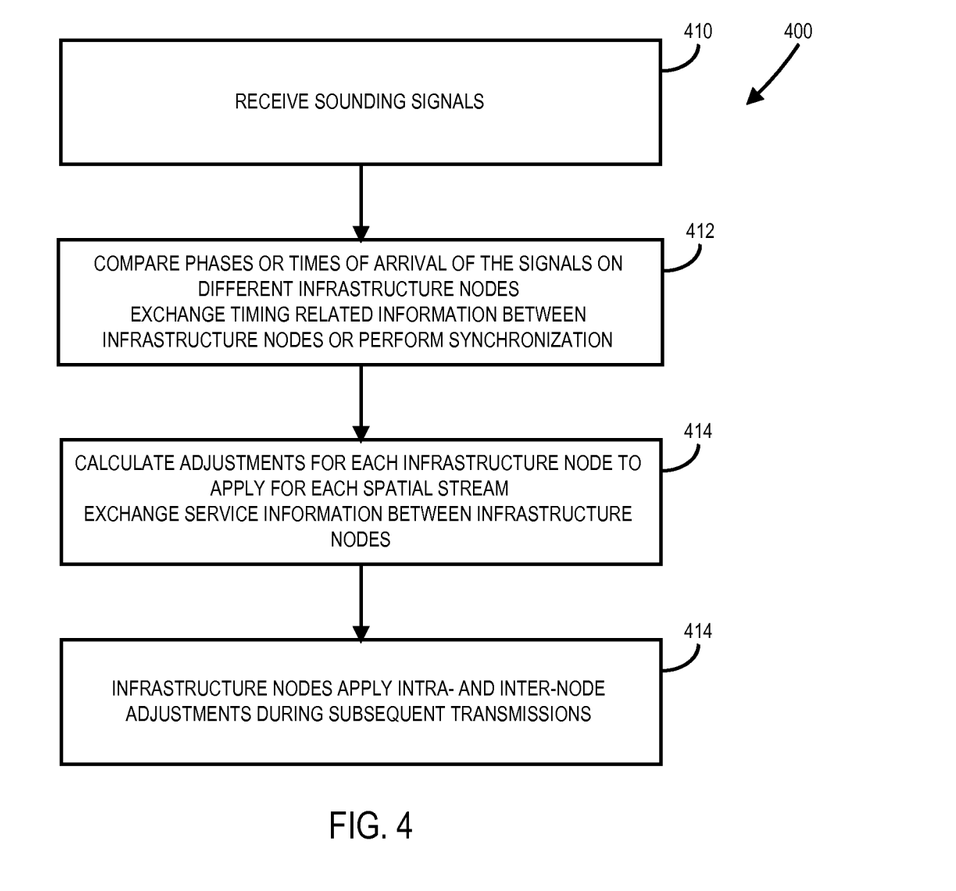
FIG. 4 is a flow diagram of a method to obtain co-phasing measurements in the uplink in accordance with one or more embodiments.

Referring now to FIG. 4, a flow diagram of a method to obtain co-phasing measurements in the uplink in accordance with one or more embodiments will be discussed. Although FIG. 4 shows one example order of blocks of a method 400 to obtain co-phasing measurements in the downlink, method 400 may encompass various other orders of the blocks, or may include more or fewer blocks, and the scope of the claimed subject matter is not limited in this respect. When measuring in the uplink, the infrastructure nodes 112 and 114 may listen to the sounding signals to estimate the phase difference or time difference of signal arrival thereon. Embodiments in which the co-phasing measurements are made in the uplink may involve synchronization of the infrastructure nodes 112 and 114. In such embodiments, at block 410, the infrastructure nodes 112 and 114 receive sounding signals from the mobile station 124. At block 412, the infrastructure nodes 112 and 114 compare the phases or the times of arrival of the signals on the different infrastructure nodes. Such a comparison may be made by exchanging timing related information between the infrastructure nodes 112 and 114, or to otherwise perform synchronization between the infrastructure nodes. At block 414, the infrastructure nodes 112 and 114 calculate the adjustments for each respective infrastructure node to apply for each spatial stream, and then exchange this service information between the infrastructure nodes. At block 414, the infrastructure nodes 112 and 114 then apply intra-node and inter-node adjustments during one or more consecutive transmissions.

Figure 5:
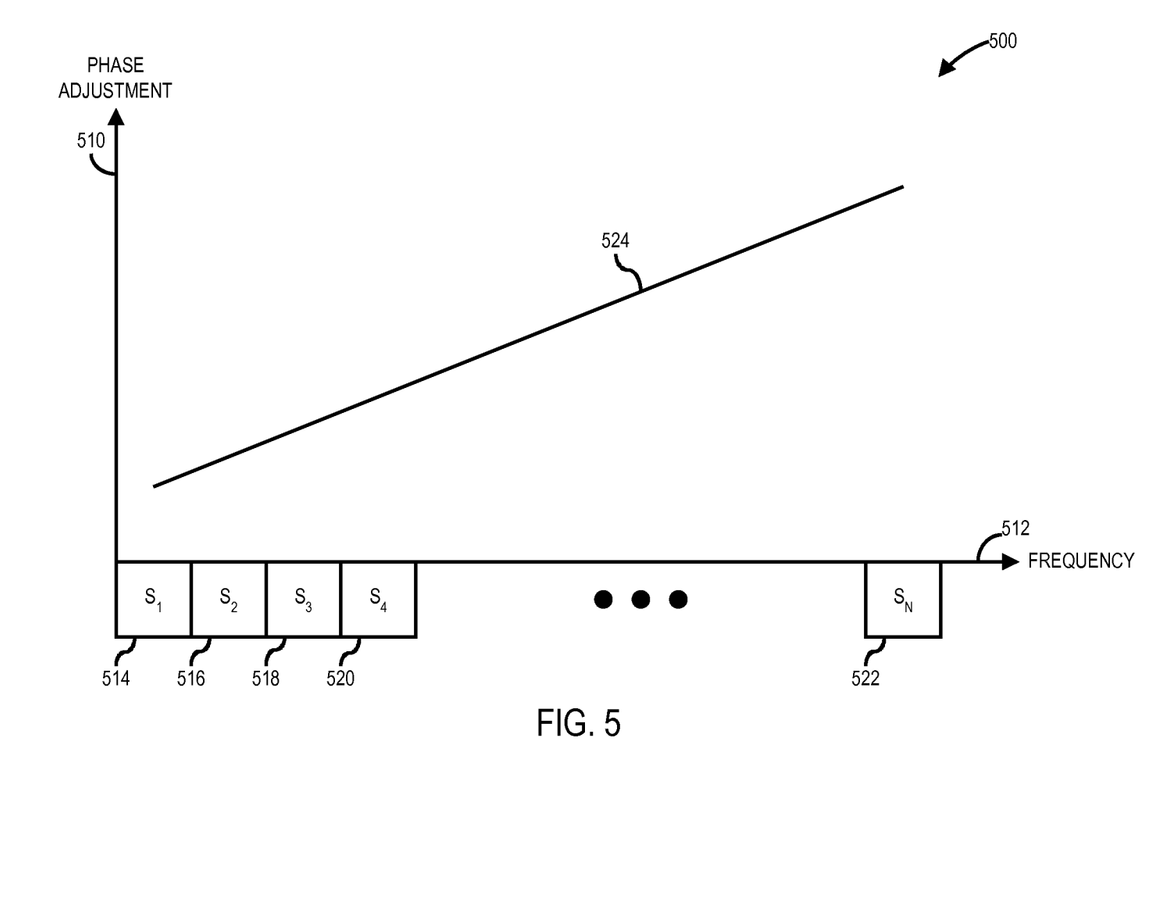
FIG. 5 is a diagram of a linear co-phasing phase adjustment per subcarrier across sub-bands in accordance with one or more embodiments.

Referring now to FIG. 5, a diagram of a linear co-phasing phase adjustment per subcarrier across sub-bands in accordance with one or more embodiments will be discussed. In one or more embodiments, phase and/or timing adjustments may be specific per subcarrier in a given sub-band, for example in accordance with a linear function of a subcarrier number in a sub-band. Thus, adjustments may be made from one sub-band to another by changing the parameters of the functions, for example, pairs of digits for a linear function as shown in FIG. 5, or a greater set of digits for a more complex function. The adjustment parameters may then be fed back per sub-band to the respective infrastructure nodes, for example through a control channel. As shown in FIG. 5, a plot 500 of the amount of phase adjustment versus frequency is shown for a Coordinated MultiPoint (CoMP) transmission system 100 as shown in FIG. 1 and FIG. 2. Phase is shown on the vertical axis 510, and frequency is shown on the horizontal axis 512. In one or more embodiments, a transmitted signal bandwidth is transmitted using multiple sub-bands, sub-band ($S_1$) 514, sub-band ($S_2$) 516, sub-band ($S_3$) 518, sub-band ($S_4$) 520, up to a Nth sub-band, sub-band ($S_N$) 522 each at its own respective subcarrier frequency in an orthogonal frequency-division multiplexing (OFDM) transmission scheme. Thus, in one or more embodiments, instead of providing the same phase adjustment for each sub-band, in the scheme shown in FIG. 5 each of the sub-bands is accorded a phase adjustment that is a function of the frequency of the sub-band. Such an arrangement may account for the fact that signals transmitted at different frequencies will arrive at the receiver with different phases since higher frequency signals will cycle through their phases faster than lower frequency signals. To accommodate such phase differences among the sub-bands, the sub-bands receive a phase adjustment as a function of their frequencies. Since the frequencies of the sub-bands are linearly spaced, the phase adjustment may be a linear function 524. Alternatively, other functions may be applied to the phase adjustment per subcarrier as a function of frequency, for example to accommodate for differing phase shifts for each frequency in a multi-path channel. If the phase shift in the channel is depending on frequency, then in one or more embodiments the phase adjustment per frequency for each subcarrier may be a nonlinear function. Since the measurements may be made by the mobile station 124 or by the infrastructure nodes 112 and 114, the needed phase adjustment as a function of frequency may be determined as part of such calculations. Alternatively, the mobile station 124 or the infrastructure nodes 112 and 114 may make calculations at just one, two, or a few frequencies corresponding to a given sub-band, and then may apply the phase adjustment function 524 to interpolate or extrapolate the needed phase adjustments for the other remaining sub-carriers. In one or more embodiments, the phase adjustment function 524 may comprise a filter function or the like wherein a first group of sub-bands is provided with a first phase adjustment profile, and a second group of sub-bands is provided with a second phase adjustment profile according to the filter function used as the phase adjustment function 524. However, these are merely example phase adjustments as a function of frequency, and the scope of the claimed subject matter is not limited in this respect.

Figure 6:
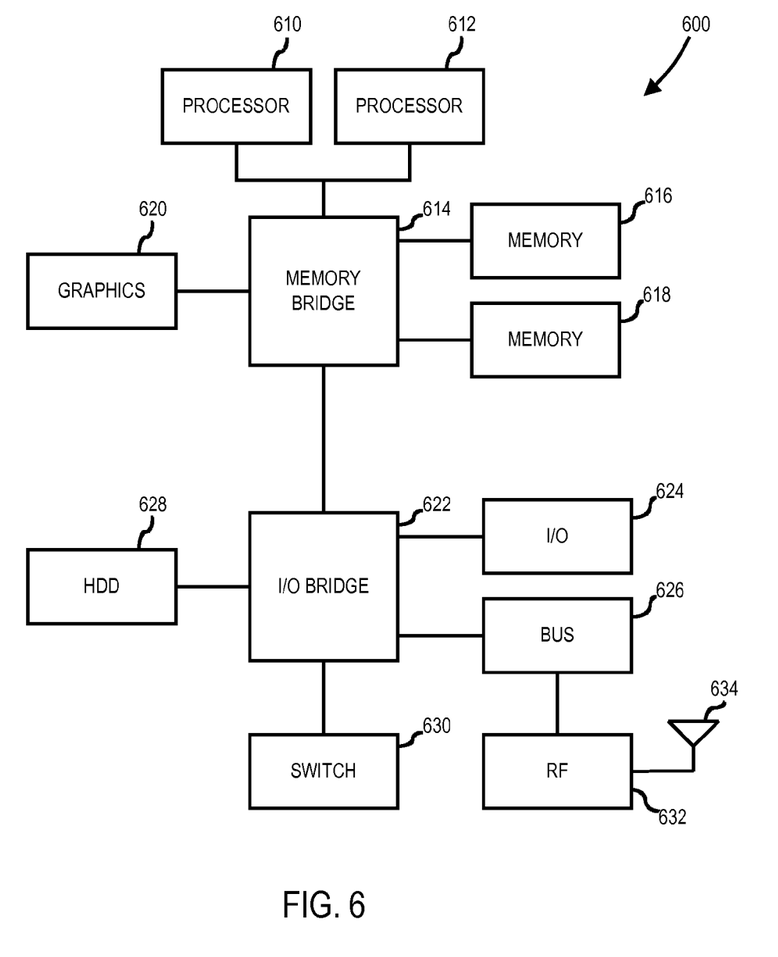
FIG. 6 is a block diagram of an information handling system capable of providing co-phasing adjustments in a Coordinated MultiPoint (CoMP) transmission system in accordance with one or more embodiments.

Referring now to FIG. 6, a block diagram of an information handling system capable of providing co-phasing adjustments in a Coordinated MultiPoint (CoMP) transmission system in accordance with one or more embodiments. Information handling system 600 of FIG. 6 may tangibly embody one or more of any of the network elements of transmission system 100 as shown in and described with respect to FIG. 1 and FIG. 2. For example, information handling system 600 may represent the hardware of infrastructure node 112, infrastructure node 114, and/or infrastructure node 124, with greater or fewer components depending on the hardware specifications of the particular device or network element. Although information handling system 600 represents one example of several types of computing platforms, information handling system 600 may include more or fewer elements and/or different arrangements of elements than shown in FIG. 6, and the scope of the claimed subject matter is not limited in these respects.

Information handling system 600 may comprise one or more processors such as processor 610 and/or processor 612, which may comprise one or more processing cores. One or more of processor 610 and/or processor 612 may couple to one or more memories 616 and/or 618 via memory bridge 614, which may be disposed external to processors 610 and/or 612, or alternatively at least partially disposed within one or more of processors 610 and/or 612. Memory 616 and/or memory 618 may comprise various types of semiconductor based memory, for example volatile type memory and/or non-volatile type memory. Memory bridge 614 may couple to a graphics system 620 to drive a display device, for example display 712 of FIG. 7, coupled to information handling system 600.

Information handling system 600 may further comprise input/output (I/O) bridge 622 to couple to various types of I/O systems. I/O system 624 may comprise, for example, a universal serial bus (USB) type system, an IEEE 1394 type system, or the like, to couple one or more peripheral devices to information handling system 600. Bus system 626 may comprise one or more bus systems such as a peripheral component interconnect (PCI) express type bus or the like, to connect one or more peripheral devices to information handling system 600. A hard disk drive (HDD) controller system 628 may couple one or more hard disk drives or the like to information handling system, for example Serial ATA type drives or the like, or alternatively a semiconductor based drive comprising flash memory, phase change, and/or chalcogenide type memory or the like. Switch 630 may be utilized to couple one or more switched devices to I/O bridge 622, for example Gigabit Ethernet type devices or the like. Furthermore, as shown in FIG. 6, information handling system 600 may include a radio-frequency (RF) transceiver 632 comprising RF circuits and devices coupled to one or more antennas 634 for wireless communication with other wireless communication devices and/or via wireless networks such as transmission system 100 of FIG. 1 of FIG. 2. Where the information handling system includes multiple antennas 634, RF receiver 632 may implement multiple-input, multiple output (MIMO) communication schemes, although the scope of the claimed subject matter is not limited in this respect. An example embodiment of an information handling system is shown in and described with respect to FIG. 7, below.

Figure 7:
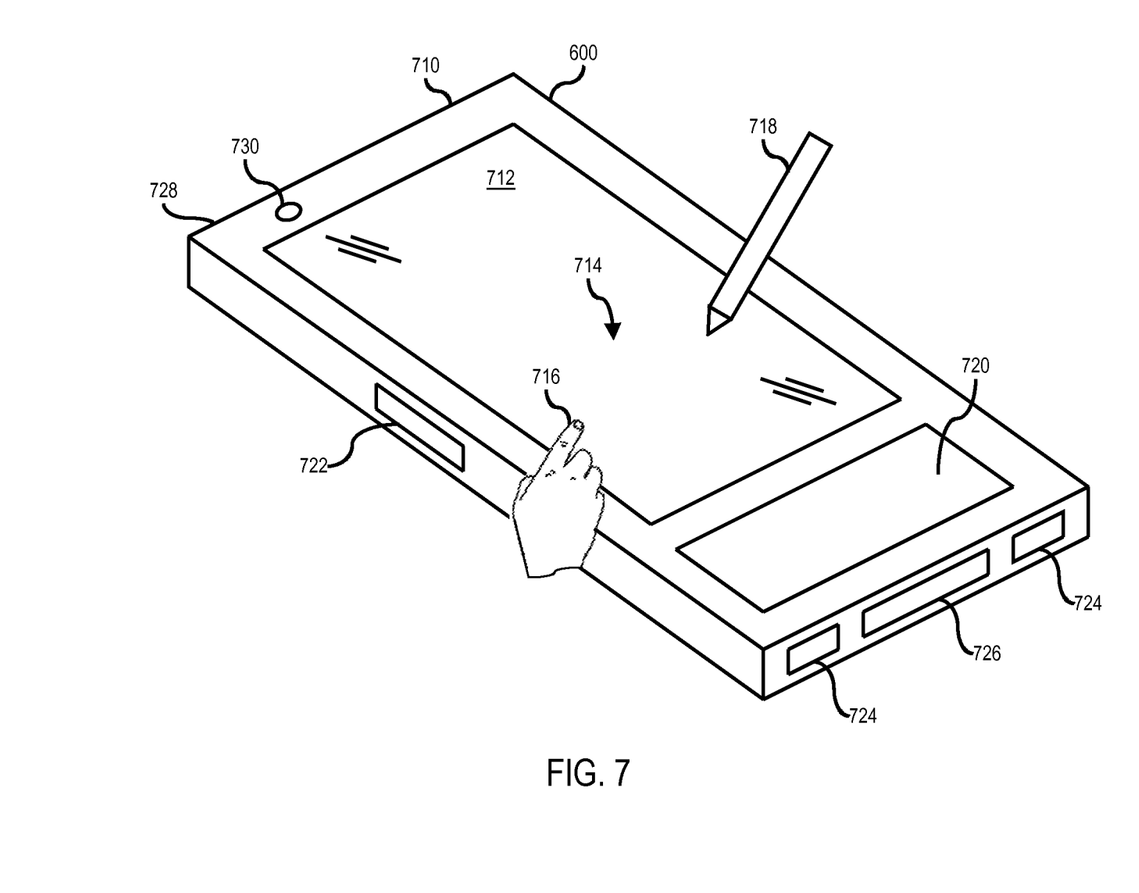
FIG. 7 is an isometric view of an information handlings system of FIG. 6 capable of providing co-phasing adjustments in a Coordinated MultiPoint (CoMP) transmission system in accordance with one or more embodiments.

FIG. 7 is an isometric view of an information handlings system of FIG. 6 capable of providing co-phasing adjustments in a Coordinated MultiPoint (CoMP) transmission system in accordance with one or more embodiments. FIG. 7 shows an example implementation of information handling system 600 of FIG. 6 tangibly embodied as a cellular telephone, or smartphone, or a tablet type device. In one or more embodiments, the information handling system 600 may comprise the mobile device 124 of FIG. 1 and FIG. 2, and as such may be capable of measuring and or adjusting the phases of one or more signals in a distributed antenna, Coordinated MultiPoint (CoMP) transmission system 100, although the scope of the claimed subject matter is not limited in this respect. The information handling system 600 may comprise a housing 710 having a display 712 which may include a touch screen 714 for receiving tactile input control and commands via a finger 716 of a user and/or a via stylus 718 to control one or more processors (or cores) 610 or 612. The housing 710 may house one or more components of information handling system 600, for example one or more processors (or cores) 610 or 612, one or more of memory 616 or 618, or transceiver 632. The information handling system 600 further may optionally include a physical actuator area 720 which may comprise a keyboard or buttons for controlling information handling system via one or more buttons or switches. The information handling system 600 may also include a port or slot 722 for receiving non-volatile memory such as flash memory, for example in the form of a secure digital (SD) card or a subscriber identity module (SIM) card. Optionally, the information handling system 600 may further include one or more speakers and/or microphones 724 and a connection port for connecting the information handling system 600 to another electronic device, dock, display, battery charger, and so on. In addition, information handling system 600 may include a headphone or speaker jack 728 and one or more cameras 730 on one or more sides of the housing 710. It should be noted that the information handling system 600 of FIG. 7 may include more or fewer elements than shown, in various arrangements, and the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to co-phasing of transmissions from multiple infrastructure nodes and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
   receiving pilot signals from two or more infrastructure nodes;
   calculating adjustments to apply to one or more spatial streams of the infrastructure nodes, wherein the adjustments comprise phase shift or timing adjustments, or combinations thereof, applied per subcarrier as a linear function of subcarrier frequency for one or more sub-bands of one or more of the spatial streams to align the two more spatial streams and allow simultaneous service by the two or more infrastructure nodes;
   transmitting the calculated adjustments to the infrastructure nodes; and
   receiving one or more subsequent coordinated multipoint transmissions from the two or more infrastructure nodes with the adjustments applied to one or more of the spatial streams received from the infrastructure nodes.

2. A method as claimed in claim 1, wherein said calculating comprises calculating intra-node adjustments by calculating pre-coding vectors for the spatial streams for respective infrastructure nodes.

3. A method as claimed in claim 1, wherein said calculating adjustments comprises calculating inter-node adjustments by calculating adjustments to apply to the spatial streams for respective infrastructure nodes.

4. An article of manufacture comprising a non-transitory storage medium having instructions stored thereon that, if executed, result in:
   receiving pilot signals from two or more infrastructure nodes; obtaining phase or timing information, or combinations thereof, from the pilot signals;
   feeding back the phase or timing information, or combinations thereof, to the infrastructure nodes; and
   receiving one or more subsequent coordinated multipoint transmissions from the infrastructure nodes with phase shift or timing adjustments, or combinations thereof, applied per subcarrier as a linear function of subcarrier frequency for one or more sub-bands to align the spatial streams transmitted by the infrastructure nodes to allow simultaneous service by the two or more infrastructure nodes.

5. An article of manufacture as claimed in claim 4, wherein the phase shift or timing adjustments, or combinations thereof, include intra-node adjustments obtained from calculated pre-coding vectors for the spatial streams for respective infrastructure nodes.

6. An article of manufacture as claimed in claim 4, wherein the phase shift or timing adjustments, or combinations thereof, include inter-node adjustments obtained from the calculated phase shift or timing adjustments, or combinations thereof, to apply to the spatial streams for respective infrastructure nodes.

7. A method, comprising:
   receiving one or more sounding signals from a remote station transmitting the sounding signals;
   comparing phases or times of arrival, or combinations thereof, of the sounding signals on two or more infrastructure nodes;
   calculating phase adjustments or timing adjustments, or combinations thereof, to apply to spatial streams for the infrastructure nodes, wherein the phase adjustments or timing adjustments, or combinations thereof, are applied per subcarrier as a linear function of subcarrier frequency for one or more sub-bands to allow the two or more infrastructure nodes to simultaneously service the remote station;
   applying intra-node phase or timing adjustments, or inter-node phase or timing adjustments, or combinations thereof during one or more coordinated multipoint transmissions from the infrastructure nodes to the remote station.

8. A method as claimed in claim 7, wherein said comparing comprises exchanging timing related information between the infrastructure nodes, or between an adjustment processor and one or more of the infrastructure nodes, or combinations thereof.

9. A method as claimed in claim 7, wherein said comparing comprises performing synchronization between the infrastructure nodes.

10. A method as claimed in claim 7, wherein said calculating comprises exchanging service information between the infrastructure nodes, or between an adjustment processor and one or more of the infrastructure node, or combinations thereof.

11. An apparatus, comprising:
    a processor and a memory coupled to the processor; and
    a transceiver coupled to the processor to send and receive radio-frequency signals;
    wherein instructions in the memory configure the processor to:
    receive pilot signals via the transceiver from two or more infrastructure nodes;
    calculate phase shift adjustments or timing adjustments, or combinations thereof, to apply to one or more spatial streams of the infrastructure nodes, wherein the adjustments comprise phase shift or timing adjustments, or combinations thereof, applied per subcarrier as a linear function of subcarrier frequency for one or more sub-bands of one or more of the spatial streams to align the two or more spatial streams and allow simultaneous service by the two or more infrastructure nodes;
    transmit the calculated phase shift or timing adjustments, or combinations thereof, via the transceiver to the infrastructure nodes; and
    receive one or more subsequent coordinated multipoint transmissions via the transceiver from the infrastructure nodes with the phase shift or timing adjustments, or combinations thereof, applied to one or more of the spatial streams received from the infrastructure nodes.

12. An apparatus as claimed in claim 11, wherein the instructions further configure the processor to calculate intra-node adjustments by calculating pre-coding vectors for the spatial streams for respective infrastructure nodes.

13. An apparatus as claimed in claim 11, wherein the instructions further configure the processor to calculate inter-node adjustments by calculating phase shifts or timing adjustments, or combinations thereof, to apply to the spatial streams for respective infrastructure nodes.

14. An apparatus as claimed in claim 11, further comprising a housing to house the processor, memory and transceiver, and further comprising a touchscreen to allow a user to control the processor.

* * * * *